No. 851,312. PATENTED APR. 23, 1907.
W. J. PARVIN.
HARNESS.
APPLICATION FILED OCT. 18, 1906.
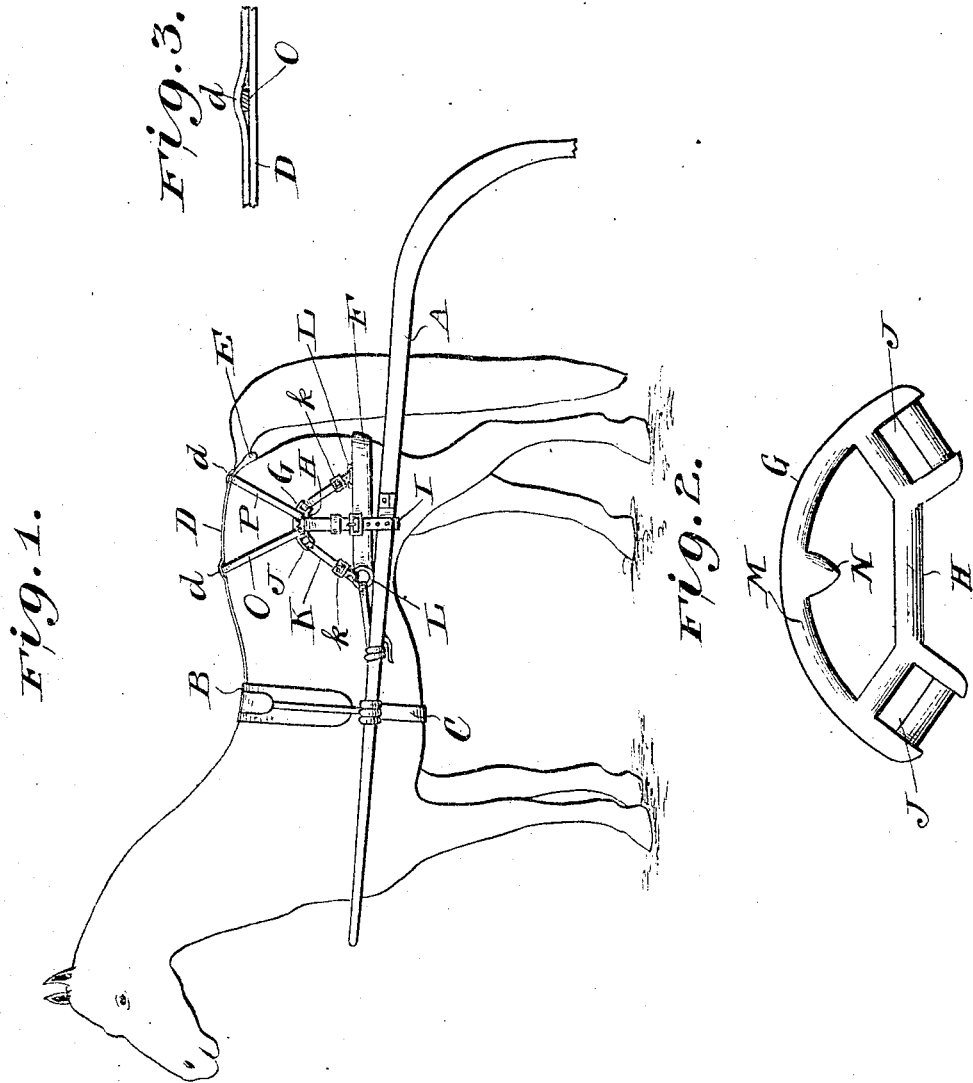
Witnesses
Jas H Blackwood
J H Randolph Jr.
Inventor
William J. Parvin,
By D. A. Gourick
Attorney

UNITED STATES PATENT OFFICE.

WILLIAM J. PARVIN, OF BRUNSWICK, MISSOURI.

HARNESS.

No. 851,312.     Specification of Letters Patent.     Patented April 23, 1907.

Application filed October 18, 1906. Serial No. 339,554.

*To all whom it may concern:*

Be it known that I, WILLIAM J. PARVIN, a citizen of the United States, residing at Brunswick, in the county of Chariton and State of Missouri, have invented certain new and useful Improvements in Harness, of which the following is a specification.

My invention relates to harness for use with single animals and consists in supporting the breeching by two straps passing through loops in the back strap, one of the straps passing through the back strap over the point of the animal's hip, the other near the root of the tail. The ends of said straps are secured to a connecting piece or loop on each side of the harness and from these connecting pieces or loops the breeching is suspended by means of straps adjustable in length. Another strap is secured to each connecting piece and adapted to be secured around the vehicle thills which acts in conjunction with the straps passing through the back strap to prevent the animal from kicking, and also as an auxiliary breeching in the event that the regular breeching should break. The strap that passes through the back strap near the root of the tail also acts in conjunction with the butt breeching to make a combined hip and butt breeching and thus adds to the effectiveness of the ordinary harness.

The details of the construction of my invention will be explained hereinafter and illustrated in the accompanying drawings, in which—

Figure 1 is a side view showing one of the thills of a carriage or wagon with the animal in position and showing my improved harness thereon, Fig. 2, a detail of the connecting piece or loop used on the breeching.

In the drawings similar reference characters indicate corresponding parts in both views.

A indicates the thills of a vehicle, B the harness saddle and C the girth secured to the saddle B and around the thills A.

D indicates the back strap connecting the saddle B and crupper E, while F indicates the breeching secured in the ordinary way to the thills A.

G indicates a connecting piece or loop on each side of the animal, each connecting piece or loop having a straight bar H on which is secured a strap I adapted to be secured around one of the thills A.

J indicates strap loops at each end of bar H in each of which is secured a strap K running through loops L on the breeching F and having their ends secured by buckles *k* of any preferred construction. By providing the buckles *k* in the breeching support straps K I provide for adjustment of the harness to animals of different sizes and shapes.

The upper portion of connecting piece or loop G consists of a curved bar M with a downwardly projecting teat N in its center. The part of bar M on each side of teat N forms a strap hold and the ends of hip straps O and P are secured thereto, said straps passing loosely through loops *d* in back strap D, strap O through a loop over the forward portion of the animals hips and strap P through a loop adjacent to the crupper E.

It will be understood from this description and an inspection of the drawings that the straps O and P which pass over the animals hips and straps I that are secured around the thills A will prevent the animal rising so as to be able to kick out behind and, as stated above, the straps K being adjustable by means of buckles *k* admit of fitting the harness to animals of different sizes and shapes. It will also be understood that strap P through connecting pieces or loops G and the strap K on each side nearest the front end of the breeching F serves to augment said breeching so that a hip breeching in combination with the ordinary butt breeching is provided. Also that should the ordinary breeching F be broken then the straps I will cooperate with the strap P and connecting piece or loop G to form an auxiliary or reserve breeching.

Having thus described my invention what I claim is—

1. In harness, in combination with a back strap having loops, and a breeching, a connecting piece at each side of the harness consisting of a straight bar, strap loops at each end thereof, and a bar connecting said strap loops and divided into two strap holds by a downwardly projecting teat, straps secured to said strap holds and passing through the loops in the back strap, adjustable straps connecting the strap loops and breeching, and straps secured to said straight bar and adapted to pass around the thills, substantially as shown and described.

2. In harness, in combination with a back strap having loops therein, one of said loops being adjacent to the crupper, the other loop being intermediate of the ends of the back strap, and the breeching, a connecting piece at each side of the harness comprising a straight bar, strap loops at each end of said straight bar, and a curved bar connecting said strap loops and divided into two strap-holds by a downwardly projecting teat, straps secured to said strap-holds and passing through the loops in the back strap, adjustable straps connecting the strap loops in the ring and the breeching, and straps secured to the straight bar and adapted to pass around the thills, substantially as shown and described.

3. In harness, in combination with a back strap, hip straps secured to the back strap, breeching, and breeching support straps secured to the breeching, a connecting piece having a straight bar, strap loops at each end of said straight bar, and a bar connecting said strap loops and divided into two strap holds by a downwardly projecting teat, the hip straps secured to said strap holds, the breeching support straps secured to the strap loops, and a strap secured to the straight bar and adapted to be secured to one of the thills, substantially as shown and described.

In testimony whereof I hereto affix my signature in the presence of two witnesses:

WILLIAM J. PARVIN.

Witnesses:
G. W. RUCKER,
O. K. BENECKE.